US009994284B2

(12) United States Patent
Urabe et al.

(10) Patent No.: US 9,994,284 B2
(45) Date of Patent: Jun. 12, 2018

(54) BICYCLE ASSIST UNIT

(71) Applicant: Shimano Inc., Sakai, Osaka (JP)

(72) Inventors: Hioryuki Urabe, Osaka (JP); Tetsuya Hino, Osaka (JP); Takashi Yamamoto, Osaka (JP)

(73) Assignee: Shimano Inc., Osaka (JP)

( * ) Notice: Subject to any disclaimer, the term of this patent is extended or adjusted under 35 U.S.C. 154(b) by 518 days.

(21) Appl. No.: 14/871,679

(22) Filed: Sep. 30, 2015

(65) Prior Publication Data

US 2016/0107721 A1 Apr. 21, 2016

(30) Foreign Application Priority Data

Oct. 16, 2014 (JP) ................................. 2014-211448

(51) Int. Cl.
*B62M 6/55* (2010.01)
*B60K 17/06* (2006.01)
*B60L 11/18* (2006.01)

(52) U.S. Cl.
CPC .............. *B62M 6/55* (2013.01); *B60K 17/06* (2013.01); *B60L 11/18* (2013.01)

(58) Field of Classification Search
CPC ...................................................... B62M 6/55
See application file for complete search history.

(56) References Cited

U.S. PATENT DOCUMENTS

| 7,040,440 | B2 | 5/2006 | Kurita et al. | |
| 8,777,791 | B1* | 7/2014 | Hino | B62M 6/55 |
| | | | | 180/206.4 |
| 9,428,245 | B2* | 8/2016 | Nishikawa | B62M 6/55 |
| 2002/0173397 | A1* | 11/2002 | Wu | B62M 6/45 |
| | | | | 475/2 |
| 2014/0051548 | A1* | 2/2014 | Hino | B62M 6/55 |
| | | | | 477/15 |
| 2015/0276042 | A1* | 10/2015 | Nishikawa | B62M 1/36 |
| | | | | 74/606 A |
| 2015/0336631 | A1* | 11/2015 | Nishikawa | B62M 6/40 |
| | | | | 74/670 |
| 2016/0288872 | A1* | 10/2016 | Shahana | B62M 6/55 |

FOREIGN PATENT DOCUMENTS

| CN | 1167064 A | 12/1997 |
| JP | 10-194186 A | 7/1998 |
| JP | 10-203466 A | 8/1998 |
| JP | 2000-6877 A | 1/2000 |
| JP | 4056130 B2 | 12/2007 |
| JP | 2013-86562 A | 5/2013 |
| JP | 2014-113912 A | 6/2014 |

* cited by examiner

*Primary Examiner* — Derek D Knight

(74) *Attorney, Agent, or Firm* — Global IP Counselors, LLP

(57) ABSTRACT

A bicycle assist unit is basically provided with a transmission and an assist motor. The transmission is configured to receive rotation of a crankshaft. The transmission includes a planetary gear mechanism. The planetary gear mechanism includes an output unit, a plurality of ring gears and a rotation restricting mechanism that selectively restricts rotation of the ring gears. The assist motor is configured to output a second drive force that is added to a first drive force that is outputted from the transmission on a power transmission path between the output unit and a front sprocket that is attached to the crankshaft.

17 Claims, 8 Drawing Sheets

BICYCLE ASSIST UNIT

CROSS-REFERENCE TO RELATED APPLICATIONS

This application claims priority to Japanese Patent Application No. 2014-11448, filed on Oct. 16, 2014. The entire disclosure of Japanese Patent Application No. 2014-211448 is hereby incorporated herein by reference.

BACKGROUND

Field of the Invention

This invention generally relates to a bicycle assist unit. More specifically, the present invention relates to a bicycle assist unit that aids a in providing a drive force through the use of a motor in addition to a manual drive force for assisting riding a bicycle.

Background Information

Generally, a bicycle assist unit comprising an assist motor and a transmission. On example of a conventional bicycle assist unit is disclosed in Japanese Laid-Open Patent Publication No. 1998-194186. In this conventional bicycle assist unit, the transmission includes a planetary gear mechanism for transmitting the drive force from the motor to propel the bicycle. In this conventional transmission, the gear ratio is determined by regulating the rotation of the ring gears using a plurality of mechanical elements binding with one of a plurality of ring gears.

SUMMARY

Generally, the present disclosure is directed to various features of a bicycle assist unit. In the conventional bicycle assist unit described above, the gear ratio of the transmission is changed after torque from an assist motor is applied. As a result, a large amount of torque is applied to the ring gear. Consequently, when shifting, applying brakes to the ring gear is difficult, and the shifting performance is impacted.

One object of the present invention is to provide a bicycle assist unit that is configured to improve the shifting performance.

In view of the state of the known technology and in accordance with a first aspect of the present disclosure, a bicycle assist unit is provided that basically comprises a transmission and an assist motor. The transmission is configured to receive rotation of a crankshaft. The transmission includes a planetary gear mechanism. The planetary gear mechanism includes an output unit, a plurality of ring gears and a rotation restricting mechanism that selectively restricts rotation of the ring gears. The assist motor is configured to output a second drive force that is added to a first drive force that is outputted from the transmission on a power transmission path between the output unit and a front sprocket that is attached to the crankshaft.

In accordance with a second aspect of the present invention, the bicycle assist unit according to the first aspect is configured so that the output unit is a carrier of the planetary gear mechanism.

In accordance with a third aspect of the present invention, the bicycle assist unit according to the first or second aspect is configured so that the assist motor is disposed outside in a radial direction with respect to a rotational axis of the planetary gear mechanism.

In accordance with a fourth aspect of the present invention, the bicycle assist unit according to any one of the first to third aspects further comprises a transmission mechanism operatively coupled to the assist motor to transmit the second drive force to the power transmission path.

In accordance with a fifth aspect of the present invention, the bicycle assist unit according to the fourth aspect is configured so that the transmission mechanism is a gear reduction mechanism that reduces a rotation of an output shaft of the assist motor.

In accordance with a sixth aspect of the present invention, the bicycle assist unit according to the fourth or fifth aspect is configured so that the transmission mechanism includes an output side transmission gear that is coupled to the planetary gear mechanism of the transmission.

In accordance with a seventh aspect of the present invention, the bicycle assist unit according to the sixth aspect is configured so that the transmission mechanism further comprises an input side transmission gear that meshes with an output shaft of the assist motor, a transmission shaft that is coupled to the input side transmission gear, and an intermediate transmission gear that is coupled with the transmission shaft and meshes with the output side transmission gear.

In accordance with an eighth aspect of the present invention, the bicycle assist unit according to any one of the first to seventh aspects is configured so that the rotation restricting mechanism comprises a plurality of pawl portions that correspond to each of the ring gears. The pawl portions are configured to engage the ring gears to restrict the rotation of the ring gears. The pawl portions are configured to detach from the ring gears to allow rotation of the ring gears.

In accordance with a ninth aspect of the present invention, the bicycle assist unit according to any one of the first to eighth aspects is configured so that the assist motor has an output shaft that is parallel to the crankshaft, when the transmission is operatively coupled the crankshaft.

In accordance with a tenth aspect of the present invention, the bicycle assist unit according to any one of the first to ninth aspects is configured so that the output unit of the planetary gear mechanism and the crankshaft rotate around a same axis, when the transmission is operatively coupled the crankshaft.

In accordance with an eleventh aspect of the present invention, the bicycle assist unit according to any one of the first to ninth aspects is configured so that the output unit of the planetary gear mechanism and the crankshaft rotate around different axes, when the transmission is operatively coupled the crankshaft.

In accordance with a twelfth aspect of the present invention, the bicycle assist unit according to any one of the first to eleventh aspects is configured so that the ring gears are axially arranged with respect to each other in an axial direction of the crankshaft when the transmission is operatively coupled the crankshaft. The ring gears have inner diameters that become larger as the ring gears are disposed farther away from the output unit along the axial direction of the crankshaft.

In accordance with a thirteenth aspect of the present invention, the bicycle assist unit according to any one of the first to twelfth aspects further comprises a speed increasing mechanism operatively coupled to the transmission to increase a rotational input of the crankshaft and to the transmission.

In accordance with a fourteenth aspect of the present invention, the bicycle assist unit according to the thirteenth aspect further comprises a one-way clutch provided between the speed increasing mechanism and the transmission.

In accordance with a fifteenth aspect of the present invention, the bicycle assist unit according to the thirteenth or fourteenth aspect is configured so that the speed increasing mechanism comprises a planetary gear mechanism including a sun gear, a planetary gear, a carrier and a ring gear. The carrier is configured to receive a rotational input of the crankshaft. The sun gear is configured to output rotation from the speed increasing mechanism.

In accordance with a sixteenth aspect of the present invention, the bicycle assist unit according to the fifteenth aspect further comprises a sensor configured to detect a manual drive force that is applied to the ring gear of the speed increasing mechanism.

In accordance with a seventeenth aspect of the present invention, the bicycle assist unit according to the sixteenth aspect is configured so that the sensor is a strain sensor.

Also other objects, features, aspects and advantages of the disclosed bicycle assist unit will become apparent to those skilled in the art from the following detailed description, which, taken in conjunction with the annexed drawings, discloses one illustrative embodiment of the bicycle assist unit.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
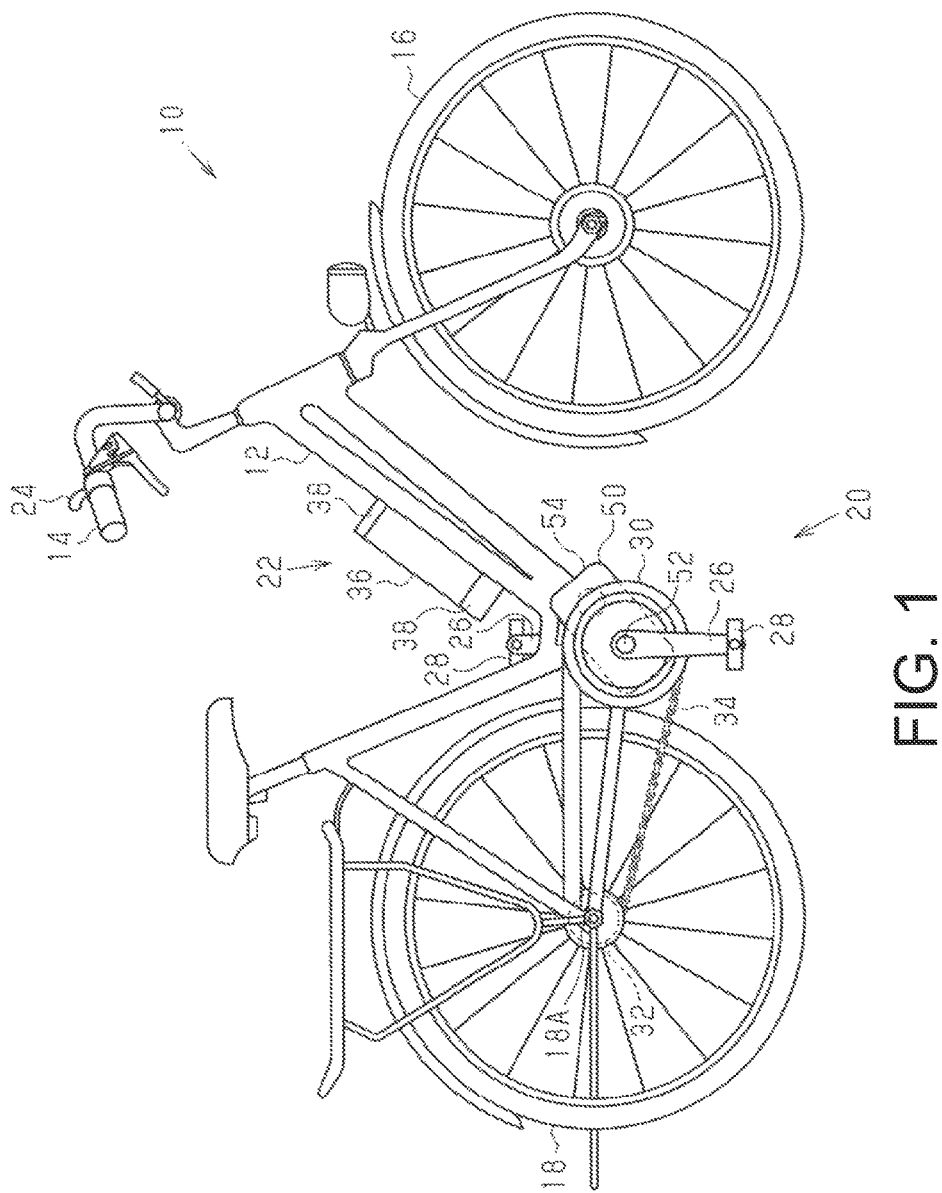
FIG. 1 is a side elevational view of a bicycle that is equipped with a bicycle assist unit in accordance with a first embodiment.

Referring initially to FIG. 1, a bicycle 10 is illustrated. The bicycle 10 comprises a frame 12, a handlebar 14, a front wheel 16, a rear wheel 18, a drive mechanism 20, a battery unit 22, a gear changing control apparatus 24 and an assist unit 50.

The drive mechanism 20 comprises a pair of (left and right) crank arms 26, a pair of (left and right) pedals 28, a front sprocket 30, a rear sprocket 32 and a chain 34. The left and right crank arms 26 are attached to both ends of a crankshaft 52 of the assist unit 50. The left and right crank arms 26 are rotatably attached to the frame 12 via the crankshaft 52. The pedals 28 are rotatably attached to the crank arms 26 such that each of the pedals 28 can rotate around a pedal shaft.

The front sprocket 30 is operatively coupled with the crankshaft 52. The front sprocket 30 is disposed coaxially on the crankshaft 52. The front sprocket 30 is rotated in response to rotation of the crank arms 26 by a manual drive force from due to a rider applying a pedaling force on the pedals 28. The front sprocket 30 is also rotated by a drive force from the assist unit 50 as discussed later.

The rear sprocket 32 is rotatably attached around an axle 18A of the rear wheel 18. The rear sprocket 32 is coupled with the rear wheel 18 via a one-way clutch. The chain 34 is wrapped onto the front sprocket 30 and the rear sprocket 32. When the crank arms 26 rotate due to the manual drive force that is applied to the pedal 28, the rear wheel 18 is rotated by the front sprocket 30, the chain 34 and the rear sprocket 32.

The battery unit 22 comprises a battery 36 and a battery holder 38. The battery holder 38 is configured to detachable attach the battery 36 to the frame 12. The battery 36 includes one or a plurality of battery cells. The battery 36 is configured as a secondary battery. The battery 36 is electrically connected to the assist unit 50, and supplies electric power to the assist unit 50.

The gear changing control apparatus 24 is attached to the handlebar 14. The gear changing control apparatus 24 can be either a lever operated gear changing control apparatus, or a gear changing control apparatus that has an operating unit that rotates about the handlebar 14. One end of a cable 40 (refer to FIG. 3) is attached to the gear changing control apparatus 24. An inner cable 40A (refer to FIG. 3) of the cable 40 (refer to FIG. 3) is attached in a pulling manner by the gear changing control apparatus 24. The pulling amount of the inner cable 40A (refer to FIG. 3) changes due to an operation of the gear changing control apparatus 24. The cable 40 (refer to FIG. 3) is a Bowden cable.

Figure 2:
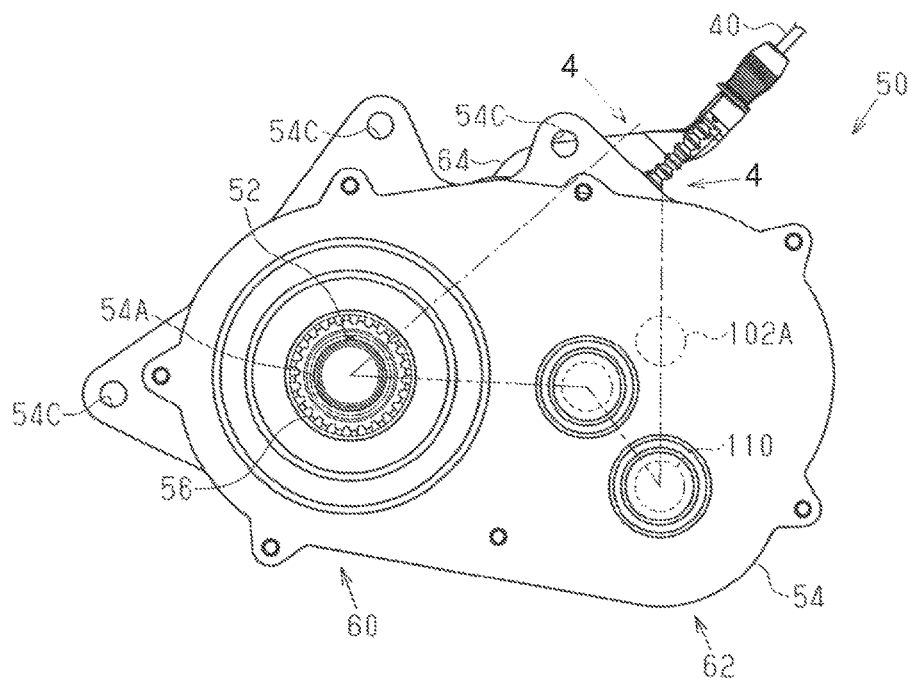
FIG. 2 is a right side elevational view of the bicycle assist unit illustrated in FIG. 1.
Figure 4:
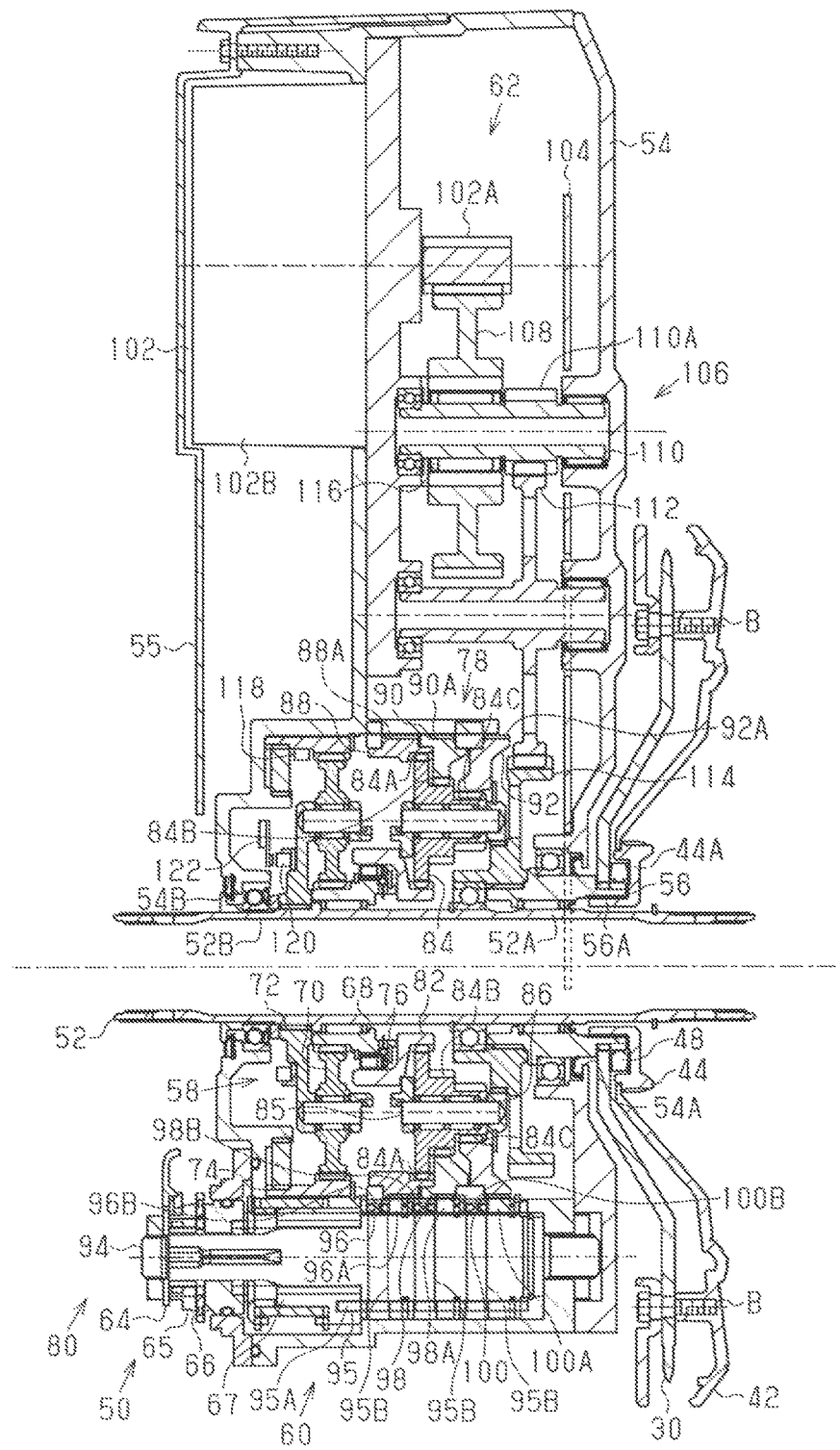
FIG. 4 is a cross-sectional view of the bicycle assist unit illustrated in FIGS. 1 to 3 as viewed along the section line 4-4 in FIG. 2.

As shown in FIG. 2, the assist unit 50 comprises a crankshaft 52, a housing 54 and an output shaft 56. The housing 54 is configured to rotatably support the crankshaft 52. The output shaft 56 is coupled to the front sprocket 30 as shown in FIG. 4. Also as shown in FIG. 4, a speed increasing mechanism 58 is disposed inside of the housing 54 for increasing the speed of the rotation that is inputted by the crankshaft 52 to the assist unit 50. Also as shown in FIG. 4, a transmission 60 is disposed inside of the housing 54 for changing the speed of the rotation that is increased by the speed increasing mechanism 58. Also as shown in FIG. 4, an assist device 62 is disposed inside of the housing 54. The assist device 62 assists the manual drive force that rotates the crankshaft 52 that is disposed inside of the housing 54.

Figure 3:
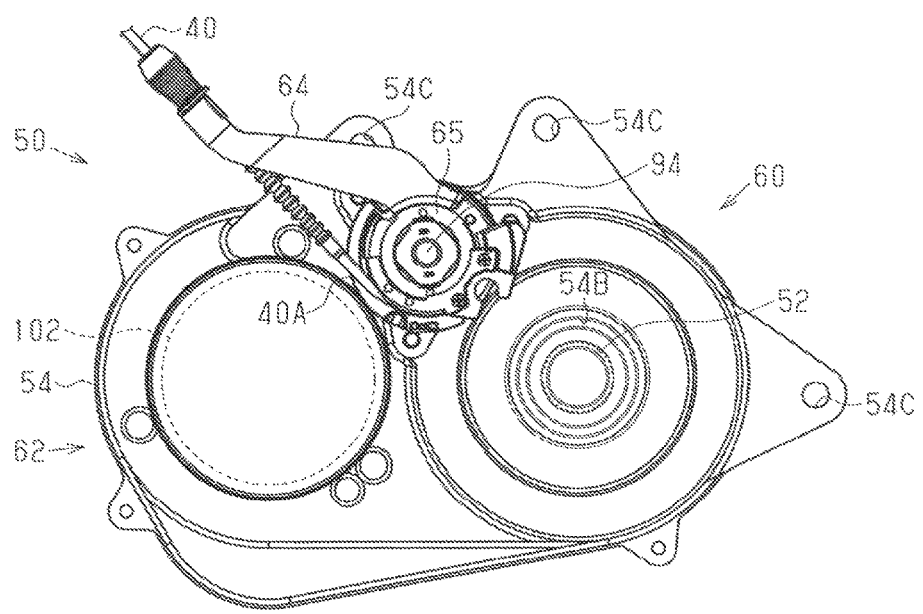
FIG. 3 is a left side elevational view of the bicycle assist unit illustrated in FIG. 1.

The housing 54 has a hole 54A that is formed on one side wall of the housing 54 for passing through the crankshaft 52 and the output shaft 56. The housing 54 has a hole 54B that is formed on the other side wall of the housing 54 for passing through the crankshaft 52. Both ends of the crankshaft 52 protrude out from the housing 54. As shown in FIG. 3, the housing 54 has an attaching portion with a plurality of holes 54C for attaching the housing 54 to the bicycle frame 12. In particular, a bolt passes through each of the holes 54C of the attaching portion for attaching the housing 54 to the bicycle frame 12.

As shown in FIG. 4, the output shaft 56 is disposed on the outer periphery of the crankshaft 52. The output shaft 56 is formed in a tubular shape, and the output shaft 56 and the crankshaft 52 are rotatable about the same axis. The crankshaft 52 may also be formed in a cylindrical shape. A spline is formed on the outer peripheral part of a first end portion 56A, which protrudes from the housing 54 of the output shaft 56. The front sprocket 30 has a spline that is formed on the inner peripheral surface of the front sprocket 30. The rotation of the front sprocket 30 in a circumferential direction with respect to the output shaft 56 is prevented by the spline on the inner peripheral surface of the front sprocket 30 meshing with the spline of the first end portion 56A of the output shaft 56. The inner peripheral surface of the first end portion 56A is provided with a female thread. A hollow bolt 44 is attached to this female thread of the inner peripheral surface of the first end portion 56A. A spacer 48 is disposed between a head 44A of the hollow bolt 44 and an end surface on the opposite side of the output shaft 56 of the front sprocket 30. The front sprocket 30 is pressed by the hollow bolt 44 via the spacer 48, and the position thereof is detachably fixed to the assist unit 50. A chain guide 42 is attached to the output shaft 56 via the bolt 44. The chain guide 42 protects the front sprocket 30. The chain guide 42 is also fixed to the front sprocket 30 by a plurality of bolts B. The axial direction of the bolt 44 matches the axial direction of the output shaft 56.

The crankshaft 52 is rotatably supported by the housing 54 in at least two axial spaced apart positions. In particular, the crankshaft 52 includes a first portion 52A and a second portion 52B. The first portion 52A is located on the side of the crankshaft 52 to which the front sprocket 30 is mounted. The first portion 52A is rotatably supported to the output shaft 56 via at least either a bearing or a sleeve. The first portion 52A can be indirectly supported to the output shaft 56 as well. The output shaft 56 is rotatably supported to a sidewall to which is formed the hole 54A of the housing 54, via a bearing or a sleeve. The second portion 52B is located on the side of the crankshaft 52 to which the front sprocket 30 is not mounted. The second portion 52B is rotatably supported via a bearing or a sleeve in the hole 54B of the sidewall of the housing 54.

As shown in FIG. 3, a coupling body 64 is attached to a side surface of the assist unit 50. The other end of the cable 40 is attached the coupling body 64. The pulling amount of the inner cable 40A (refer to FIG. 3) of the cable 40 of the gear changing control apparatus 24 changes with an operation of the gear changing control apparatus 24 shown in FIG. 1, thereby moving the inner cable 40A. The coupling body 64 rotatably supports a rotating body 65 to which the inner cable 40A is attached. The rotating body 65 rotates in one way or the other in response to a directional movement of the inner cable 40A. The coupling body 64 is coupled to a rotation restricting mechanism 80, as shown in FIG. 4.

The speed increasing mechanism 58 is formed of a planetary gear mechanism. The speed increasing mechanism 58 comprises a plurality of planetary gears 70, a carrier 72 and a ring gear 74. The sun gear 68 is supported by the crankshaft 52 so as to be able to rotate with respect to the crankshaft 52 via a bearing or a sleeve. The planetary gears 70 are disposed around the sun gear 68 and meshed with the sun gear. The carrier 72 is attached to the crankshaft 52, and integrally rotates with the crankshaft 52. The carrier 72 rotatably supports the planetary gears 70. The ring gear 74 is fixedly attached to the inner surface of the housing 54, and mesh with the planetary gears 70. The ring gear 74 can also be integrally formed with the housing 54.

The rotation of the crankshaft 52 is input into the speed increasing mechanism 58 from the carrier 72. The carrier 72 rotates around the crankshaft 52 by rotating the planetary gear 70 around the inner periphery of the ring gear 74, as well as the sun gear 68. The rotation of the planetary gear 70 is transmitted to the sun gear 68. The rotation of the sun gear 68 is transmitted to the planetary gear mechanism 78 of the transmission 60.

The speed increasing mechanism 58 and the transmission 60 are coupled via a one-way clutch 76. The one-way clutch 76 is configured by a roller clutch or a pawl-type clutch. The one-way clutch 76 transmits the rotation of the speed increasing mechanism 58 to the transmission 60 when the output rotational speed of the speed increasing mechanism 58 during the forward rotation of the crankshaft 52 is greater than or equal to the input rotational speed of the transmission 60.

The transmission 60 comprises a planetary gear mechanism 78 and a rotation restricting mechanism 80. The planetary gear mechanism 78 comprises a sun gear 82, a plurality of planetary gears 84, a carrier 86 and a plurality of ring gears 88, 90, 92. The carrier 86 constitutes an output unit of the transmission 60. In the present embodiment, the planetary gear mechanism 78 includes three ring gears (i.e., the first ring gear 88, the second ring gear 90 and the third ring gear 92). The transmission 60 realizes a three-stage gear ratio by selectively restricting the rotation of one of the first ring gear 88, the second ring gear 90 and the third ring gear 92.

The sun gear 82 is supported by the sun gear 68 of the speed increasing mechanism 58 via the one-way clutch 76. The planetary gears 84 are disposed around the sun gear 82 and in meshed with the sun gear 82. For example, the planetary gears 84 are provided in a circumferential direction of the crankshaft 52 at equal intervals. The planetary gears 84 are so-called stepped planetary gears. The planetary gears 84 each comprise a first gear portion 84A, a second gear portion 84B and a third gear portion 84C. The second gear portion 84B has fewer teeth, and is smaller in diameter than the first gear portion 84A. The third gear portion 84C has fewer teeth, and is smaller in diameter than the second gear portion 849. The first gear portion 84A, the second gear portion 849 and the third gear portion 84C are arranged in order from the sun gear 82, which is the input side, to the end portion side having the front sprocket 30 of the carrier 86, which is the output unit of the planetary gear mechanism 78.

The carrier 86 rotatably supports the planetary gears 84 by holding the position of a pin 85, which extends through the planetary gears 84, around the sun gear 82. The carrier 86 and the crankshaft 52 rotate around the same axis. The end of the carrier 86 on the side with the front sprocket 30 has a cylindrical shape. The inner periphery of end of the carrier 86 is serrated and engaged with a transmission gear 114 that is coupled to the output shaft 56. The carrier 86 and the transmission gear 114 integrally rotate.

The ring gears 88, 90, 92 are rotatably attached to the inner surface of the housing 54. Of the outer peripheral part of the ring gears 88, 90, 92, one portion in a direction of the crankshaft 52 is supported by the inner surface of the housing 54. The outer peripheral part of the ring gears 88, 90, 92 can be supported by the inner surface of the housing 54 via a bearing or a sleeve. The outer diameters of the ring gears 88, 90, 92 are equal. The ring gears 88, 90, 92 are axially arranged in the axial direction along the crankshaft 52. The ring gears 88, 90, 92 are arranged such that the ring gears 88, 90, 92 relatively closer to the output unit (the end portion of the carrier 86 on the side with the front sprocket 30) of the transmission 60 have smaller diameters than the ring gears 88, 90, 92 that are relatively farther away from the output unit of the transmission 60. Specifically, the ring gears 88, 90, 92 are arranged from the side with the sun gear 82, which is the input side, to the output unit side in the order of the first ring gear 88, the second ring gear 90, and the third ring gear 92. Additionally, the numbers of teeth and the inner diameters of the ring gears 88, 90, 92 are reduced in the order of the first ring gear 88, the second ring gear 90 and the third ring gear 92.

The first ring gear 88 meshes with the first gear portion 84A. The second ring gear 90 meshes with the second gear portion 84B. The third ring gear 92 meshes with the third gear portion 84C.

The rotation of the crankshaft 52 is accelerated by the speed increasing mechanism 58, and then the rotation from the crankshaft 52 is input into the transmission 60 by the sun gear 82. The sun gear 82 rotates the planetary gears 84 which rotate about the inner periphery of the ring gears 88, 90, 92. As the planetary gears 84 rotate, this rotation of the planetary gears 84 rotates the carrier 86 around the rotaional axis of the sun gear 82. The rotation of the carrier 86 is transmitted to the output shaft 56 that is attached to the inner peripheral of the carrier 86. In the present embodiment, the outer diameters of the sun gear 68 of the transmission 60 and the sun gear 82 of the speed increasing mechanism 58 are formed to be equal. The inner diameter of the first ring gear 88 and the inner diameter of the speed increasing mechanism 58 are formed to be equal. The outer diameter of the first gear portion 84A, which has the largest diameter of all of the planetary gears 84 of the transmission 60, and the outer diameter of the planetary gears 70 of the speed increasing mechanism 58 are formed to be equal.

The rotation restricting mechanism 80 comprises a shaft 94, a gear shift sleeve 95, a first clutch member 96, a second clutch member 98 and a third clutch member 100. The rotation restricting mechanism 80 selectively restricts the rotation of one of the ring gear 88, 90 and 92.

The shaft 94 is disposed outside of the ring gears 88, 90, 92 in the radial direction. The axial direction of the shaft 94 is parallel to the axial direction of the ring gears 88, 90, 92. The first clutch member 96, the second clutch member 98 and the third clutch member 100 are disposed on the outer periphery of the shaft 94 and spaced apart in the axial direction of the shaft 94.

The first clutch member 96 is disposed between the shaft 94 and the first ring gear 88. The second clutch member 98 is disposed between the shaft 94 and the second ring gear 90. The third clutch member 100 is disposed between the shaft 94 and the third ring gear 92. The first clutch member 96, the second clutch member 98 and the third clutch member 100 are pawl-type clutches, which are formed to be able to move between a protruding (engaged) position and a retracted (disengaged) position. The first clutch member 96, the second clutch member 98 and the third clutch member 100 are pressed toward the protruding position by springs.

Figure 5:
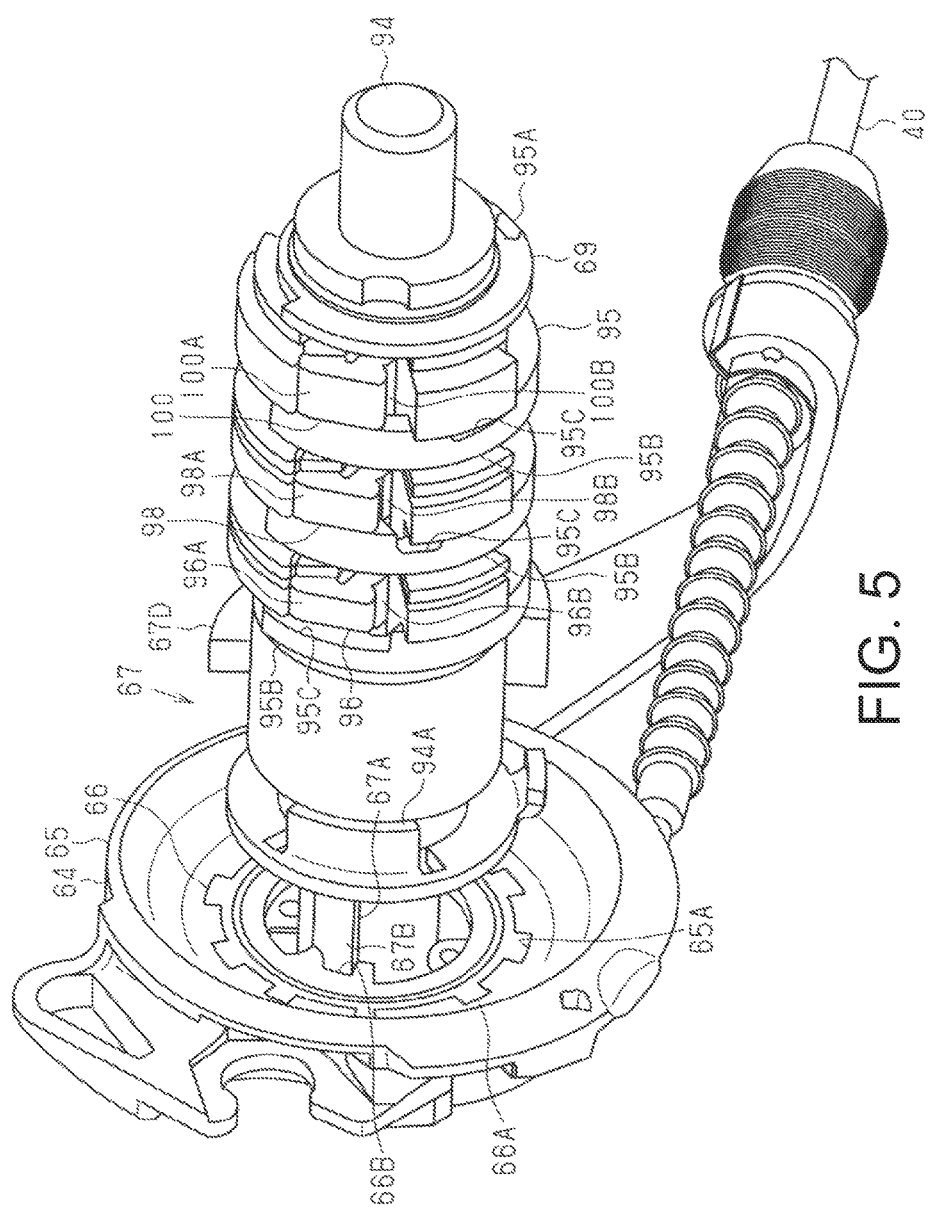
FIG. 5 is a perspective view of the rotation restricting mechanism of the bicycle assist unit illustrated in FIG. 4.

As shown in FIG. 5, the rotating body 65 of the coupling body 64 is coupled to a connected portion 66 that is provided to the shaft 94. A protrusion 66A is provided to the outer periphery of the connected portion 66 and protrudes in the radial direction. A recess 65A is formed on the inner peripheral part of the rotating body 65. The protrusion 66A of the connected portion 66 fits into the recess 65A. The connected portion 66 and the gear shift sleeve 95 are coupled via a connecting member 67. The connecting member 67 comprises a first connecting member 67A and a second connecting member 67D. The first connecting member 67A and the second connecting member 67D are formed to have a tubular shape. Alternatively, the rotating body 65 or the connected portion 66 can be directly connected with the gear shift sleeve 95. A return spring (not shown) has one end fixed to the shaft 94 and the other end of the return spring coupled to the second connecting member 67D. The return spring is a coil spring that is provided on the outer periphery of the second connecting member 67D. The shaft 94A has a protrusion 94A that protrudes in the radial direction of the shaft 94. The protrusion 94A is fixed to the shaft 94. One end of the return spring (not shown) is coupled to the shaft 94 via the protrusion 94A. The return spring (not shown) applies a force to the gear shift sleeve 95 to return the gear shift sleeve 95 to the initial position via the second connecting member 67D.

Figure 6:
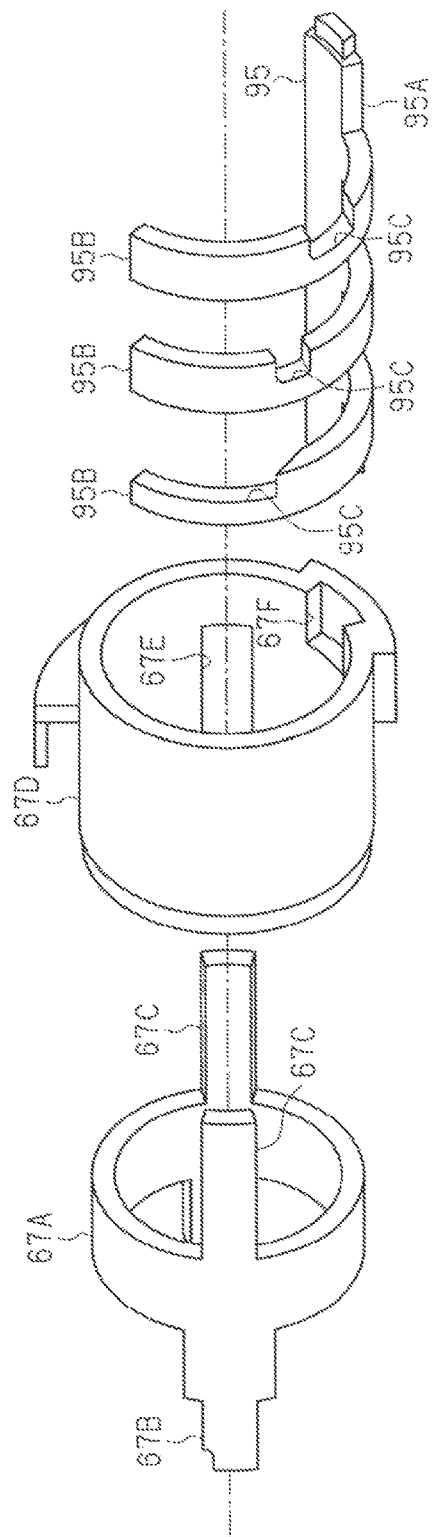
FIG. 6 is an exploded perspective view of selected parts of the rotation restricting mechanism for the bicycle assist unit illustrated in FIG. 5 and showing a connecting member and a gear shift sleeve.

As shown in FIG. 6, the first connecting member 67A comprises a pair of first protrusions 67B and a pair of second protrusions 67C. The first protrusions 67B protrude from a center tubular body in the axial direction with respect to the shaft 94 towards the connected portion 66 (see FIG. 5). The second protrusions 67C protrude from the center tubular body in the opposite axial direction from the first protrusions 67B. The second connecting member 67D comprises a pair of first recesses 67E and a second recess 67F. The first and second recesses 67E and 67F extend in the axial direction of the shaft 94 (see FIG. 6). As shown in FIG. 5, the first protrusions 67B (only one shown in FIG. 5) are fitted to recesses 66B that are formed in the connected portion 66. As shown in FIG. 6, the second protrusions 67C are fitted to the first recesses 67E. One end portion of a base 95A of the gear shift sleeve 95 is fitted to the second recess 67F. The other end portion of the base 95A is held to an annular retaining member 69 that is provided on the outer periphery of the shaft 94 as shown in FIG. 5. The gear shift sleeve 95 rotates along the outer periphery of the shaft 94, along with the rotation of the connected portion 66, which is generated by an operation of the gear changing control apparatus 24 (refer to FIG. 1).

As shown in FIG. 6, the base 95A of the gear shift sleeve 95 extends in axial direction and a plurality of arms 95B that extend from the base 95A in the circumferential direction of the shaft 94. Each one of the arms 95B corresponds to one of the first clutch member 96, the second clutch member 98 and the third clutch member 100. Each of the clutch members 96, 98, 100 comprises a pawl member 96A, 98A, 100A and a controlled portion 969, 98B, 100B, respectively. The controlled portions 969, 98B, 100B of the clutch members 96, 98, 100 are disposed between the arms 95B and the shaft 94. A groove 95C is formed on a portion of each of the arms 95B that extends in the circumferential direction of the shaft 94. The controlled portions 96B, 98B, 100B move in and out of the groove 95C by moving the arm 95B in the circumferential direction of the shaft 94, which moves the pawl portions 96A, 98A, 100A of the clutch members 96, 98, 100 to the retracted position and to the protruding position. The groove 95C can also be in the form of a hole instead of the cutouts as shown.

In response to the rotational phase of the gear shift sleeve 95, the arms 95B of the gear shift sleeve 95 come in contact with the controlled portions 96B, 98B, 100B to control the clutch members 96, 98, 100. As shown in FIG. 6, the grooves 95C in each of the arms 95B of the gear shift sleeve 95 have different phases around the shaft 94. For this reason, the gear shift sleeve 95 is able to selectively move only one pawl portion 96A, 98A, 100A of the clutch members 96, 98, 100 to the protruding position according to the rotational phase.

When the first clutch member 96 changes from the retracted position to the protruding position, the pawl portion 96A of the first clutch member 96 is fitted to a recess 88A that is formed on the outer periphery of the first ring gear 88, and the rotation of the first ring gear 88 is restricted due to the rotation of the gear shift sleeve 95 shown in FIG. 4. When the first clutch member 96 changes from the protruding position to the retracted position, the pawl portion 96A of the first clutch member 96 detaches from the recess 88A that is formed on the outer periphery of the first ring gear 88, and the rotation of the first ring gear 88 is allowed. The recesses 88A are arranged in the circumferential direction of the ring gear 88 and are preferably formed as ratchet teeth.

When the second clutch member 98 changes from the retracted position to the protruding position, the pawl portion 98A of the second clutch member 98 is fitted to a recess 90A that is formed on the outer periphery of the second ring gear 90, and the rotation of the second ring gear 90 is restricted due to the rotation of the gear shift sleeve 95. When the second clutch member 98 changes from the protruding position to the retracted position, the pawl portion 98A of the second clutch member 98 detaches from the recess 90A that is formed on the outer periphery of the second ring gear 90, and the rotation of the second ring gear 90 is allowed. The recesses 90A are arranged in the circumferential direction of the ring gear 90 and are preferably formed as ratchet teeth.

When the third clutch member 100 changes from the retracted position to the protruding position, the pawl portion 100A of the third clutch member 100 is fitted to a recess 92A that is formed on the outer periphery of the third ring gear 92, and the rotation of the third ring gear 92 is restricted due to the rotation of the gear shift sleeve 95. When the third clutch member 100 changes from the protruding position to the retracted position, the pawl portion 100A of the third clutch member 100 detaches from the recess 92A that is formed on the outer periphery of the third ring gear 92, and the rotation of the third ring gear 92 is allowed. The recesses 92A are arranged in the circumferential direction of the ring gear 92 and are preferably formed as ratchet teeth.

The arms 95B have shapes that are different from each other. For this reason, the combination of the ring gears 88, 90, 92 that are allowed to rotate differs depending on the rotational phase of the gear shift sleeve 95. Since each of the ring gears 88, 90, 92 has a different number of teeth, the rotational state of each element of the planetary gear mechanism 78 differs depending on the combination of ring gears 88, 90, 92 that are allowed to rotate. For this reason, the gear ratio of the transmission 60 changes due to an operation of the rotation restricting mechanism 80.

As seen in FIG. 4, the assist device 62 comprises an assist motor 102, a drive unit 104 and a transmission mechanism 106. The drive unit 104 controls the assist motor 102. The transmission mechanism 106 transmits a second drive force of the assist motor 102 to the power transmission path.

The assist motor 102 is disposed outside in the radial direction of the planetary gear mechanism 78 with respect to the rotational axis of the planetary gear mechanism 78. The assist motor 102 includes an output shaft 102A (output element) and a main body 102B. The output shaft 102A of the assist motor 102 and the crankshaft 52 are parallel with each other. The assist motor 102 is an electric motor. The assist motor 102 is fixed to the housing 54. A main body 102B of the assist motor 102 includes a rotor and a stator that are not shown. The main body 102B is located outside of the housing 54, while the output shaft 102A is located inside of the housing 54. The main body 102B of the assist motor 102 is covered by a cover member 55 that is attached to the housing 54.

The transmission mechanism 106 is a speed reducing mechanism, which decelerates the rotation of the output shaft 102A of the assist motor 102. The transmission mechanism 106 comprises an input side transmission gear 108, a transmission shaft 110, an intermediate transmission gear 112 and an output side transmission gear 114. The input side transmission gear 108 meshes with the output shaft 102A of the assist motor 102. The transmission shaft 110 is coupled with the input side transmission gear 108. The intermediate transmission gear 112 is coupled with the transmission shaft 110. The output side transmission gear 114 meshes with the intermediate transmission gear 112. The output side transmission gear 114 is coupled with the carrier 86 of the transmission 60. The transmission gear 114 is coupled to the output shaft 56 by serration. The transmission gear 114 is rotatably held to the crankshaft 52 via a bearing. The carrier 86 and the transmission gear 114 may also be integrally formed. The output shaft 102A of the assist motor 102 is coupled to a rotor (not shown) of the assist motor 102. The output shaft 102A can be an integrally formed output shaft, or a can be formed by a gear that is fixed to the output shaft. The two ends of the transmission shaft 110 are rotatably supported by the housing 54 via a bearing or a sleeve. The two ends of the transmission gear 112 are rotatably supported by the housing 54 via a bearing or a sleeve. The rotational axis of the transmission shaft 110 and the rotational axis of the transmission gear 112 are provided to be parallel to the crankshaft 52.

The input side transmission gear 108 and the transmission shaft 110 are coupled via a one-way clutch 116. The one-way clutch 116 is configured by a roller clutch or a pawl-type clutch. The one-way clutch 116 transmits the torque of the assist motor 102 to the transmission shaft when the rotational speed of the input side transmission gear 108 is greater than or equal to the rotational speed of the transmission shaft 110. The teeth 110A are formed on the outer peripheral part of the transmission shaft 110, and mesh with the transmission gear 112.

The assist unit 50 further comprises a sensor 118 for detecting the manual drive force. The sensor 118 is a strain sensor. The sensor 118 is attached to the ring gear 74 of the speed increasing mechanism 58. The sensor 118 outputs a signal corresponding to the manual drive force that is applied to the ring gear 74. A magnet 120 is provided to the crankshaft 52 or the carrier 72 for detecting the rotational speed of the crankshaft 52. A magnet detection sensor 122 is provided to the housing 54 to detect the magnet.

The drive unit 104 is provided inside of the housing 54. The drive unit 104 is fixed to the inner peripheral part of the housing 54. The drive unit 104 comprises a circuit board. The main surface of the circuit board is extends in a direction that is perpendicular to the crankshaft 52. The drive unit 104 drives the assist motor 102 based on the output of at least either the sensor 118 or the magnet detection sensor 122. The drive unit 104 can also drive the assist motor 102 based on the output of at least either the sensors 118, 122 or a sensor that detects the speed of the bicycle 10 (not shown).

The assist unit 50 exerts the following actions and effects.

(1) The transmission mechanism 106 transmits the rotation of the assist motor 102 to the carrier 86. That is, in the assist unit 50, the second drive force that is output from the assist motor 102 is decelerated and added to the first drive force that is output from the transmission 60 on a power transmission path between the carrier 86, which is the output unit of the transmission 60, and the front sprocket 30. For this reason, only the torque that is generated by the manual drive force is applied to the ring gears 88, 90, 92 of the transmission 60. As a result, when compared to adding the second drive force that is output from the assist motor 102 before the input unit of the transmission 60, the load that is applied to the pawl portions 96A, 98A, 100A when the pawl portions 96A, 98A, 110A detach from the ring gears 88, 90, 92 is smaller. Therefore, suppressing the time for shifting from taking longer is possible due to the fact that the time required for the pawl portions 96A, 98A, 100A to detach from the ring gears 88, 90, 92 becomes longer; or, suppressing the failure of the shifting is possible due to the pawl portions 96A, 98A, 100A not being able to detach from the ring gears 88, 90, 92. For this reason, the shifting performance is improved.

(2) In the assist unit 50, the assist motor 102 is disposed to be outside in the radial direction of the planetary gear mechanism 78 with respect to the rotational axis of the planetary gear mechanism 78. For this reason, as compared to when the assist motor 102 is adjacent to the planetary gear mechanism 78 in the axial direction of the crankshaft 52, reducing the widthwise size of the bicycle 10 of the assist unit 50 is possible.

(3) The speed increasing mechanism 58 and the transmission 60 are connected via the one-way clutch 76. The assist unit 50 comprises a sensor 118 for detecting the manual drive force that is applied to the ring gear 74 of the speed increasing mechanism 58. For this reason, the sensor 118 is able to detect the manual drive force that is not affected by the torque of the assist motor 102. As a result, the assist unit 50 is able to more appropriately drive the assist motor 102.

The specific form that the present assist unit can take is not limited to the forms illustrated in the above-described embodiment. The present assist unit can take various forms that are different from the above-described embodiment. The modified example of the above-described embodiment explainedbelowis one example of the various forms that the present assist unit can take.

The output unit of the planetary gear mechanism 78 and the crankshaft 52 can be configured to rotate around different axes. In this case, the input unit of the planetary gear mechanism 78 and the crankshaft 52 will also rotate around different rotational axes in such a drive unit, the crankshaft 52 is disposed to be outside in the radial direction of the ring gear of the planetary gear mechanism 78.

Figure 7:
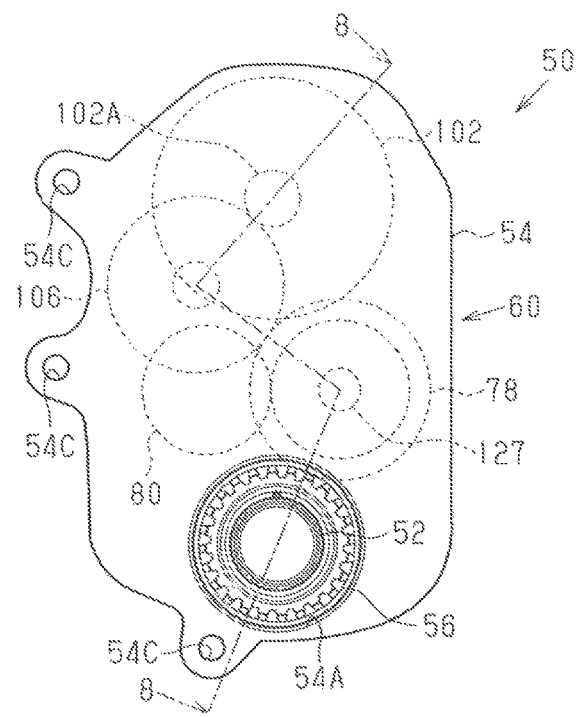
FIG. 7 is a right side elevational view of a first modified example of the bicycle assist unit.

In the radial direction, as shown in FIG. 7, the planetary gear mechanism 78 and the rotation restricting mechanism 80 are disposed between the crankshaft 52 and the assist motor 102. The planetary gear mechanism 78 is provided to a shaft 127, which is provided to be parallel to the crankshaft 52. The shaft 127 is provided as being fixed to the housing 54. For example, the two ends of the shaft 127 in the axial direction are both fixed to the wall of the housing 54.

Figure 8:
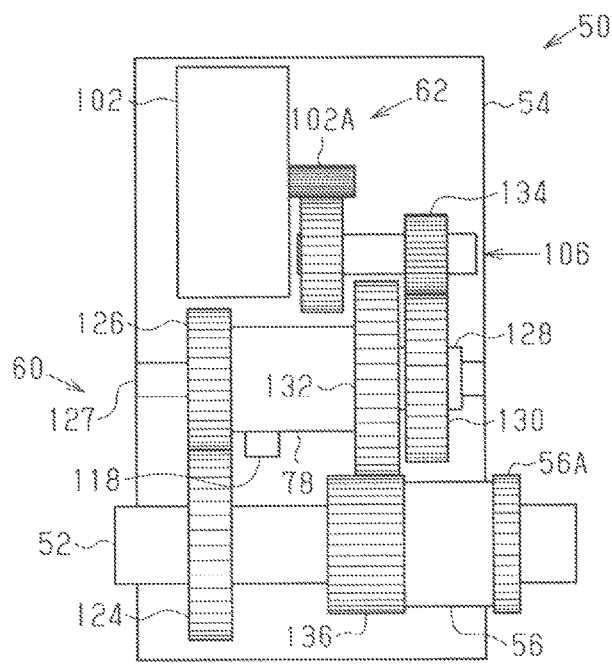
FIG. 8 is a schematic cross-sectional view of the bicycle assist unit illustrated in FIG. 7 and showing a structure as viewed along the section line 8-8 in FIG. 7.

As shown in FIG. 8, a gear 124 is provided on the outer periphery of the crankshaft 52. The gear 124 meshes with an input gear 126 that integrally rotates with sun gear (not shown), which is an input unit of the planetary gear mechanism 78. The input gear 126 and the sun gear (not shown) are rotatably provided to the shaft 127. The speed increasing mechanism is configured by the gear 124 and the input gear 126. The gear 124 can be provided fixed to the crankshaft 52 or provided to the crankshaft 52 via a one-way clutch. When the gear 124 is provided fixed to the crankshaft 52, a one-way clutch may be provided between the input gear 126 and the sun gear. A transmission gear 130 and the output gear 132 are provided to an output shaft 128 that integrally rotates with a carrier (not shown) of the planetary gear mechanism 78. The output shaft 128, the transmission gear 130 and the output gear 132 are rotatably provided to the shaft 127. A rotation support member, such as a sleeve or a bearing, can be provided between the shaft 127 and the output shaft 128, the transmission gear 130, or the output gear 132. Here, the number of teeth on the transmission gear 130 and the output gear 132 vary, but the number of teeth on the transmission gear 130 and the output gear 132 may be the same. When making the number of teeth on the transmission gear 130 and the output gear 132 the same, configuring the function of the transmission gear 130 and the output gear 132 with one gear is possible. The transmission gear 130 and the output gear 132 are coupled so as to integrally rotate.

Figure 9:
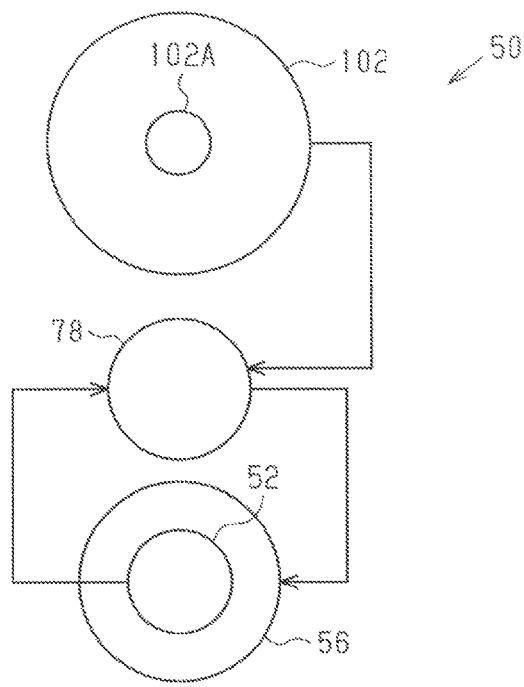
FIG. 9 is a schematic view showing a configuration of a first modified example of the bicycle assist unit illustrated in FIG. 8.

A transmission gear 134 of the transmission mechanism 106 is coupled with the assist motor 102 and meshes with the transmission gear 130. The output gear 132 meshes with an input gear 136 that is provided on the outer periphery of the output shaft 56. The input gear 136 is provided fixed to the output shaft 56 and integrally rotates with the output shaft 56. The rotation of the crankshaft 52 is thereby transmitted to the input unit of the planetary gear mechanism 78, and the output of the assist motor 102 is transmitted to the output unit of the planetary gear mechanism 78, as shown in FIG. 9. Then, the output of the planetary gear mechanism 78 and the output of the assist motor 102 are transmitted to the output shaft 56.

When employing the configuration shown in FIG. 8, providing the planetary gear mechanism 78 around a different axis than the crankshaft 52 is possible; as a result, suppressing the size of the housing 54 from increasing around the crankshaft 52 is possible. In a normal bicycle, the distance to the ground is the shortest around the crankshaft 52. For this reason, ensuring clearance with the ground is possible by disposing the planetary gear mechanism 78 around a different axis than the crankshaft 52. Preferably, the planetary gear mechanism 78 and the motor 102 are disposed on the opposite side of the rear wheel 18 across from the crankshaft 52 when attached to a bicycle 10. If disposed in this way, disposing the rear wheel 18 close to the crankshaft 52 is possible by disposing the planetary gear mechanism 78 around a different axis than the crankshaft 52; as a result, reducing the distance between the crankshaft 52 and the rear wheel 18 is possible.

Figure 10:
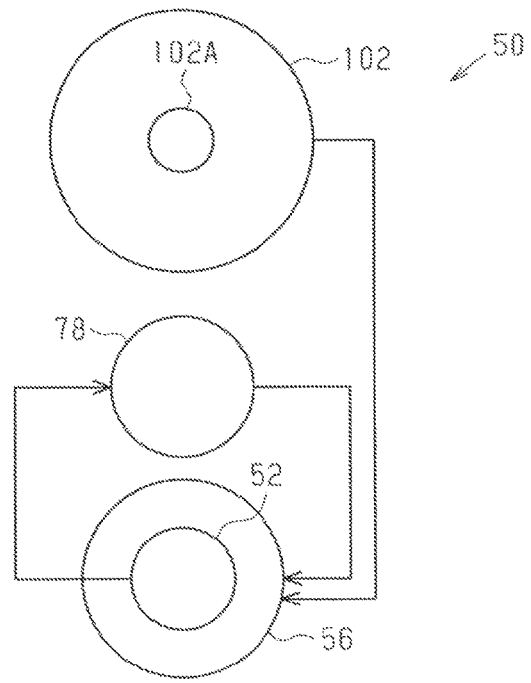
FIG. 10 is a schematic view showing a configuration of a second modified example of the bicycle assist unit.
Figure 11:
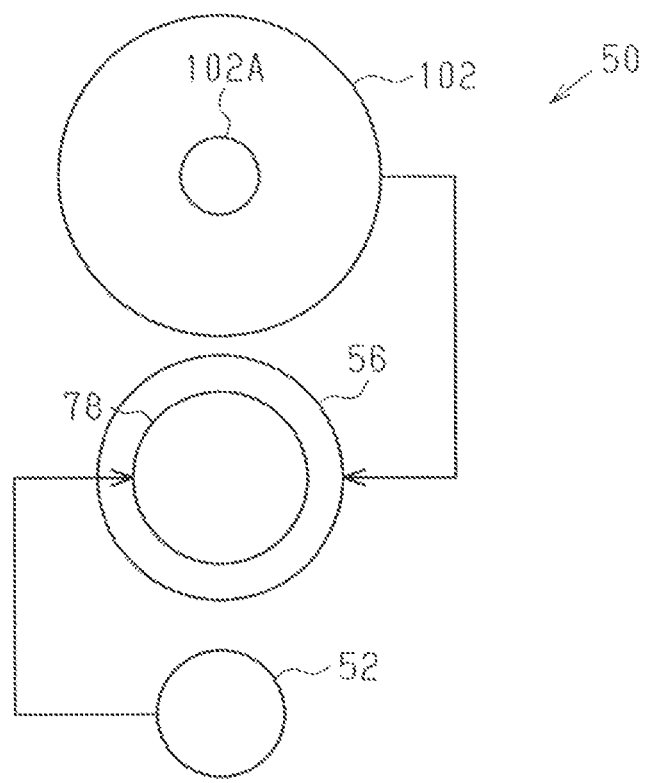
FIG. 11 is a schematic view showing the configuration of a third modified example of the bicycle assist unit.

- In the modified example shown in FIGS. 7-9, it is also possible to connect the output unit of the planetary gear mechanism 78 and the output shaft 56 with a chain or a sprocket.
- In the modified example shown in FIGS. 7-9, it is also possible to connect the crankshaft 52 and the planetary gear, mechanism 78, not with a gear, but with a configuration that includes a chain and a sprocket; or a configuration that includes a gear, a chain, and a sprocket. In this case, the chain and the sprocket function as a speed increasing mechanism that accelerates the rotation of the crankshaft 52.
- It is also possible to change the modified example shown in FIGS. 7-9 to that shown in FIG. 10. Specifically, the output of the assist motor 102 is transmitted to the output shaft 56 without passing through the output unit of the planetary gear mechanism 78.
- It is also possible to change the modified example shown in FIGS. 7-9 to that shown in FIG. 11. Specifically, as shown in FIG. 10, the output shaft 56 is disposed to be around the same axis as the shaft 127 of the planetary gear mechanism 78. In this case, the output of the assist motor 102 may be configured to be transmitted to the output shaft 56 without passing through the output unit of the planetary gear mechanism 78; or the output of the assist motor may be configured to be transmitted to an output shaft 128 (refer to FIG. 8) of the planetary gear mechanism 78. In this case, rotating the front sprocket 30 around a different axis than the crankshaft 52 is possible, and improving the degree of freedom in the design of the bicycle 10 is possible. Additionally, the output shaft 56 may be provided to the housing 54 so as to rotate around a different axis than the crankshaft 52 or the shaft 127. In this case, a shaft that rotatably supports the output shaft 56 is provided to the housing 54.

It is possible to locate the assist motor 102 in a position adjacent to the planetary gear mechanism 78 in the axial direction of the crankshaft 52. For example, the configuration may be such that the output shaft of the assist motor 102 is formed to be hollow, the crankshaft 52 is inserted into the output shaft 102A of the assist motor, and the assist motor 102 and the crankshaft 52 are rotated around the same axis. In this case, the transmission mechanism 106 may be formed of a planetary gear mechanism. Additionally, for example, only a part of the assist motor 102 may be disposed adjacent to the planetary gear mechanism 78 in the axial direction of the crankshaft 52.

It is also possible to omit the transmission mechanism 106 and directly coupling the output shaft 102A of the assist motor 102 and the carrier 86 or the output shaft 56. The configuration of the transmission mechanism 106 is not limited to the above-described configuration, and the number of gears and the number of teeth on the gears may be freely selected as long as the necessary gear ratio can be obtained according to the performance and the characteristic of the assist motor 102. For example, the transmission mechanism 106 may be configured to include a chain and a sprocket, rather than a gear, or this mechanism may be configured to include a gear, a chain, and a sprocket. In this case, the chain and the sprocket function as a speed reducing mechanism that decelerates the rotation of the assist motor 102.

It is also possible to omit the one-way clutch 116 that is provided to the transmission mechanism 106.

The one-way clutch 116 is not limited to being between the transmission gear 108 and the transmission shaft 110 and may be provided to any portion along the path from the output shaft 102A of the assist motor 102 to the front sprocket 30. As a result, preventing the output shaft 102A of the assist motor 102 from being rotated by the manual drive force is possible.

It is also possible to locate the assist motor 102 so that the output shaft 102A and the crankshaft 52 are not parallel. In this case, for example, a bevel gear is provided to the transmission mechanism 106 to couple the assist motor 102 and the carrier 86. As a result, improving the degree of freedom for disposing the assist motor 102 is possible.

It is also possible to make the inner diameter of the ring gears 88, 90, 92 that are relatively farther away from the output unit smaller than the inner diameter of the ring gears 88, 90, 92 that are relatively closer to the output unit of the transmission 60.

It is also possible to omit the speed increasing mechanism 58. In this case, the rotation of the crankshaft 52 is directly transmitted to the sun gear 82.

It is also possible to omit the one-way clutch 76 that is provided between the speed increasing mechanism 58 and the transmission 60. In this case, reversely rotating the front sprocket 30 by reversely rotating the crankshaft 52 is possible. If a coaster brake is provided to the rear wheel 18, then operating this coaster brake is also possible.

It is also possible to couple the speed increasing mechanism 58 to the carrier 72 of the transmission 60 and increasing the speed of the rotation after the speed was changed by the transmission 60 are possible. In this case, coupling the output side transmission gear 114 to the output unit of the speed increasing mechanism 58 is also possible.

It is also possible to attach the sensor 118 to the crankshaft 52, the sun gear 68, the planetary gear 70, or the carrier 72. In this case as well, the sensor 118 is able to detect the manual drive force that is not affected by the torque of the assist motor 102.

It is also possible to attaching the sensor 118 to the planetary gear mechanism 78.

It is also possible to locate the assist device 62 and the transmission 60 in different housings.

It is also possible to change the coupling body 64 to an electrically-operated gear shifter that electrically controls the rotating body 65. The electrically-operated gear shifter comprises an electric motor and a reduction gear and is electrically connected to the gear changing control apparatus 24.

It is also possible to change the rotation restricting mechanism 80 to that which simultaneously restricts the rotation of two ring gears 88, 90, 92 of the plurality of ring gears 88, 90, 92.

It is also possible to change the rotation restricting mechanism 80 to that which selectively restricts the rotation of the plurality of ring gears 88, 90, 92 with a belt that makes contact with the outer periphery of the plurality of ring gears 88, 90, 92. Even with a configuration in which the rotation of the plurality of ring gears 88, 90, 92 is restricted by a belt, when restricting the rotation of the ring gears 88, 90, 92, applying brakes to the ring gears is more difficult as the torque that is applied to the ring gears 88, 90, 92 increases, and the shifting performance is degraded. For this reason, achieving the effects according to effect (1) of the embodiment is possible.

It is also possible to use a transmission 60 that realizes a two-stage gear ratio or a transmission 60 that realizes a gear ratio of four or more stages.

The configuration of the transmission 60 can be appropriately changed. In short, the transmission of the assist unit 50 may be any transmission that transmits the rotation of the crankshaft and that comprises a planetary gear mechanism comprising a plurality of ring gears and a rotation restricting mechanism that selectively restricts the rotation of each ring gear.

While only selected embodiments have been chosen to illustrate the present invention, it will be apparent to those skilled in the art from this disclosure that various changes and modifications can be made herein without departing from the scope of the invention as defined in the appended claims. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle assist unit comprising:
a transmission configured to receive rotation of a crankshaft, the transmission including a planetary gear mechanism including an output unit, a plurality of ring gears and a rotation restricting mechanism that selectively restricts rotation of the ring gears; and
an assist motor configured to output a second drive force that is added to a first drive force that is outputted from the transmission on a power transmission path between the output unit and a front sprocket.

2. The bicycle assist unit as recited in claim 1, wherein the output unit is a carrier of the planetary gear mechanism.

3. The bicycle assist unit as recited in claim 1, wherein the assist motor is disposed outside in a radial direction with respect to a rotational axis of the planetary gear mechanism.

4. The bicycle assist unit as recited in claim 1, further comprising
a transmission mechanism operatively coupled to the assist motor to transmit the second drive force to the power transmission path.

5. The bicycle assist unit as recited in claim 4, wherein the transmission mechanism is a gear reduction mechanism that reduces a rotation of an output shaft of the assist motor.

6. The bicycle assist unit as recited in claim 4, wherein the transmission mechanism includes an output side transmission gear that is coupled to the output unit of the planetary gear mechanism.

7. The bicycle assist unit as recited in claim 6, wherein the transmission mechanism further comprises an input side transmission gear that meshes with an output shaft of the assist motor, a transmission shaft that is coupled to the input side transmission gear, and an intermediate transmission gear that is coupled with the transmission shaft and meshes with the output side transmission gear.

8. The bicycle assist unit as recited in claim 1, wherein the rotation restricting mechanism comprises a plurality of pawl portions that correspond to each of the ring gears, the pawl portions being configured to engage the ring gears to restrict the rotation of the ring gears, and the pawl portions being configured to detach from the ring gears to allow rotation of the ring gears.

9. The bicycle assist unit as recited in claim 1, wherein the assist motor has an output shaft that is parallel to the crankshaft, when the transmission is operatively coupled the crankshaft.

10. The bicycle assist unit as recited in claim 1, wherein the output unit of the planetary gear mechanism and the crankshaft rotate around a same axis, when the transmission is operatively coupled the crankshaft.

11. The bicycle assist unit as recited in claim 1, wherein the output unit of the planetary gear mechanism and the crankshaft rotate around different axes, when the transmission is operatively coupled the crankshaft.

12. The bicycle assist unit as recited in claim 1, wherein
the ring gears are axially arranged with respect to each other in an axial direction of the crankshaft when the transmission is operatively coupled the crankshaft, and
the ring gears have inner diameters that become larger as the ring gears are disposed farther away from the output unit along the axial direction of the crankshaft.

13. The bicycle assist unit as recited in claim 1, further comprising
a speed increasing mechanism operatively coupled to the transmission to increase a rotational input of the crankshaft and to the transmission.

14. The bicycle assist unit as recited in claim 13, further comprising
a one-way clutch provided between the speed increasing mechanism and the transmission.

15. The bicycle assist unit as recited in claim 13, wherein the speed increasing mechanism comprises a planetary gear mechanism including a sun gear, a planetary gear, a carrier and a ring gear, the carrier being configured to receive a rotational input of the crankshaft, and the sun gear being configured to output rotation from the speed increasing mechanism.

16. The bicycle assist unit as recited in claim 15, further comprising
a sensor configured to detect a manual drive force that is applied to the ring gear of the speed increasing mechanism.

17. The bicycle assist unit as recited in claim 16, wherein the sensor is a strain sensor.

* * * * *